United States Patent
Sokol

(10) Patent No.: US 10,837,475 B2
(45) Date of Patent: Nov. 17, 2020

(54) VORTEX GENERATORS POSITIONED IN FLOWTUBES TO PROMOTE BOUNDARY LAYER ADHERENCE OF FLOW THROUGH A FLOWTUBE OF A METER

(71) Applicant: Sensus Spectrum, LLC, Morrisville, NC (US)

(72) Inventor: Benjamin John Sokol, Carrboro, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 122 days.

(21) Appl. No.: 16/169,069

(22) Filed: Oct. 24, 2018

(65) Prior Publication Data

US 2020/0132094 A1  Apr. 30, 2020

(51) Int. Cl.
 F15D 1/06 (2006.01)
 F15D 1/00 (2006.01)
 G01F 15/00 (2006.01)

(52) U.S. Cl.
 CPC .......... *F15D 1/06* (2013.01); *F15D 1/0035* (2013.01); *G01F 15/00* (2013.01)

(58) Field of Classification Search
 None
 See application file for complete search history.

(56) References Cited

U.S. PATENT DOCUMENTS

| | | | |
|---|---|---|---|
| 6,390,418 B1 * | 5/2002 | McCormick | B64C 23/00 244/1 N |
| 2010/0108813 A1 | 5/2010 | Lang | |
| 2012/0018021 A1 * | 1/2012 | Babinsky | F15C 1/16 137/808 |
| 2012/0282105 A1 * | 11/2012 | Grife | F03D 1/0675 416/228 |
| 2013/0000305 A1 * | 1/2013 | Smith | F02K 1/28 60/697 |
| 2014/0224940 A1 * | 8/2014 | Rybalko | F02K 7/10 244/53 B |
| 2015/0101402 A1 | 4/2015 | Kishikawa et al. | |
| 2017/0114794 A1 * | 4/2017 | Duong | F02C 3/08 |
| 2017/0276525 A1 | 9/2017 | Morino et al. | |
| 2019/0264922 A1 * | 8/2019 | Resvanis | F15D 1/065 |

FOREIGN PATENT DOCUMENTS

| DE | 10 2012 209149 A1 | 12/2013 |
|---|---|---|
| JP | H11 281424 A | 10/1999 |

OTHER PUBLICATIONS

Notification of Transmittal of the international Search Report and the Written Opinion of the International Searching Authority, or the Declaration, PCT/US019/039403 dated Oct. 17, 2019.

* cited by examiner

*Primary Examiner* — Harshad R Patel
(74) *Attorney, Agent, or Firm* — Stanek Lemon Crouse & Meeks, P.A.

(57) ABSTRACT

A vortex generator for use in a flowtube of a meter is provided. The vortex generator includes a plurality of raised elements on an inner surface of a flowtube. The plurality of raised elements are positioned on the inner surface of the flowtube upstream of a widening of the flowtube. The presence of the plurality of raised elements improves boundary layer adherence.

18 Claims, 5 Drawing Sheets

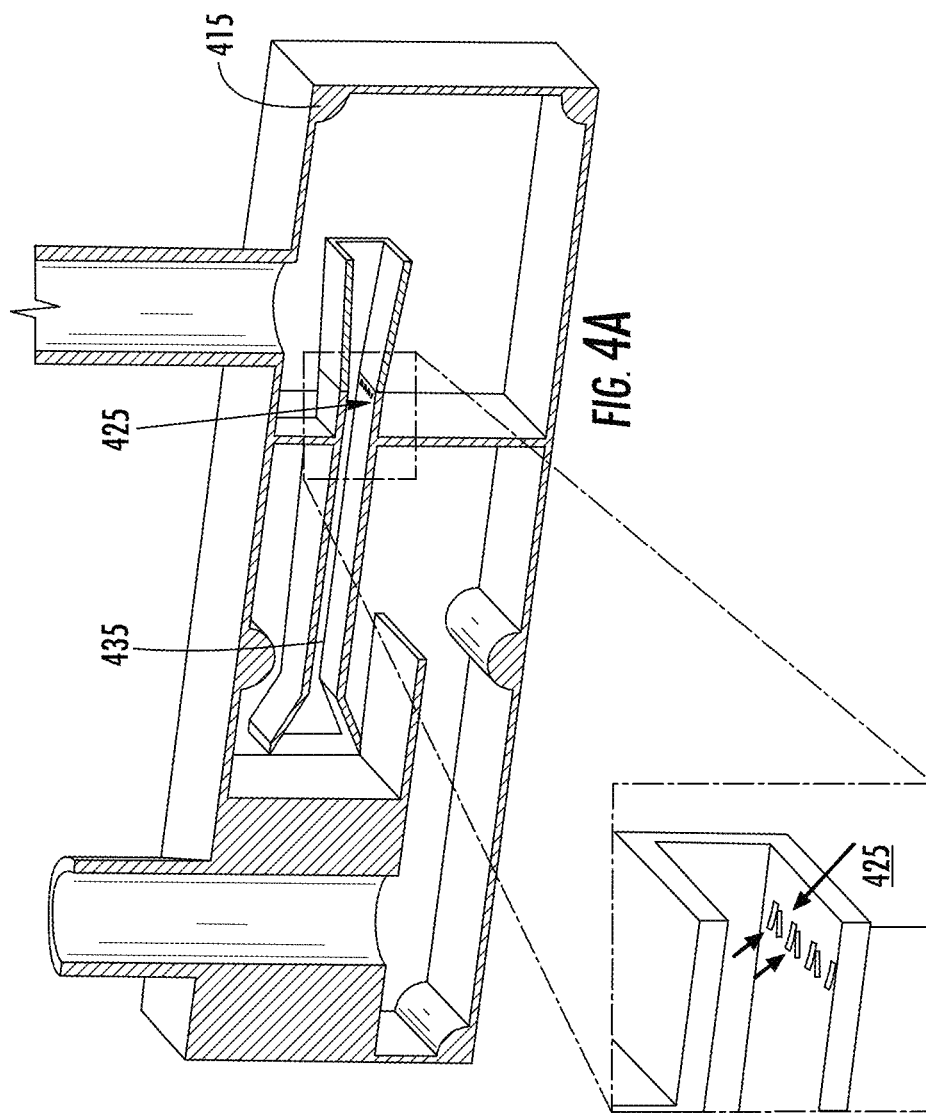

VORTEX GENERATORS POSITIONED IN FLOWTUBES TO PROMOTE BOUNDARY LAYER ADHERENCE OF FLOW THROUGH A FLOWTUBE OF A METER

FIELD

The present inventive concept relates generally to meters and, more particularly, to boundary layer flow separation in meters.

BACKGROUND

How gas flows through a meter can affect the overall performance of the meter. One issue that routinely affects a meter's performance is flow separation. Flow separation generally occurs when a boundary layer travels far enough against an adverse pressure gradient that the speed of the boundary layer relative to the object falls almost to zero. Thus, the gas flow may become detached from the surface of the object, and instead takes the forms of eddies and vortices.

An example of boundary layer flow separation is illustrated, for example, in FIG. 1. As illustrated in FIG. 1, the fluid flowing through the meter may separate from the wall of the tube and leave a space 110 between the wall and the rest of the fluid. Boundary layer flow separation can cause issues in gas meter flowtubes. For example, boundary layer flow separation may cause inconsistent flow velocities resulting from flow oscillation (variation), which affects measurement accuracy. Furthermore, flow separation may also cause increased pressure drop due to inefficient deceleration of the flow as it exits the flowtube.

SUMMARY

Some embodiments of the present inventive concept provide a vortex generator for use in a flowtube of a meter. The vortex generator includes a plurality of raised elements on an inner surface of a flowtube. The plurality of raised elements are positioned on the inner surface of the flowtube upstream of a widening of the flowtube. The presence of the plurality of raised elements improves boundary layer adherence.

In further embodiments, the plurality of raised elements on the inner surface of the flowtube may promote a turbulent flow in the flowtube.

In still further embodiments, the plurality of raised elements may include a plurality of shapes molded into a plastic inner surface of the flowtube.

In some embodiments, the plurality of shapes may include a plurality of V shapes.

In further embodiments, the plurality of raised elements may include a plurality of shapes positioned and affixed on a plastic inner surface of the flowtube.

In still further embodiments, the meter may be gas meter.

Some embodiments of the present inventive concept provide a system for improving boundary adherence in a flowtube of a meter. The system includes a flowtube configured to have an increased cross-section at an end thereof, the increased cross-section providing an increased area of flow to decelerate a flow in the flowtube; and a vortex generator include a plurality of raised elements on an inner surface of the flowtube upstream of the increased cross-section, the presence of the plurality of raised elements improving boundary layer adherence in the flowtube.

Still further embodiments of the present inventive concept provide a meter including a flowtube configured to have an increased cross-section at an end thereof, the increased cross-section providing an increased area of flow to decelerate a flow in the flowtube; and a vortex generator including a plurality of raised elements on an inner surface of the flowtube upstream of the increased cross-section, the presence of the plurality of raised elements improving boundary layer adherence in the flowtube.

BRIEF DESCRIPTION OF THE DRAWINGS

FIG. 4A is a diagram of a meter including a flowtube having a vortex generator in accordance with some embodiments of the present inventive concept.

FIG. 4B is a diagram illustrating an expanded view of the vortex generator of FIG. 4A in accordance with some embodiments of the present inventive concept.

DETAILED DESCRIPTION

Figure 1:
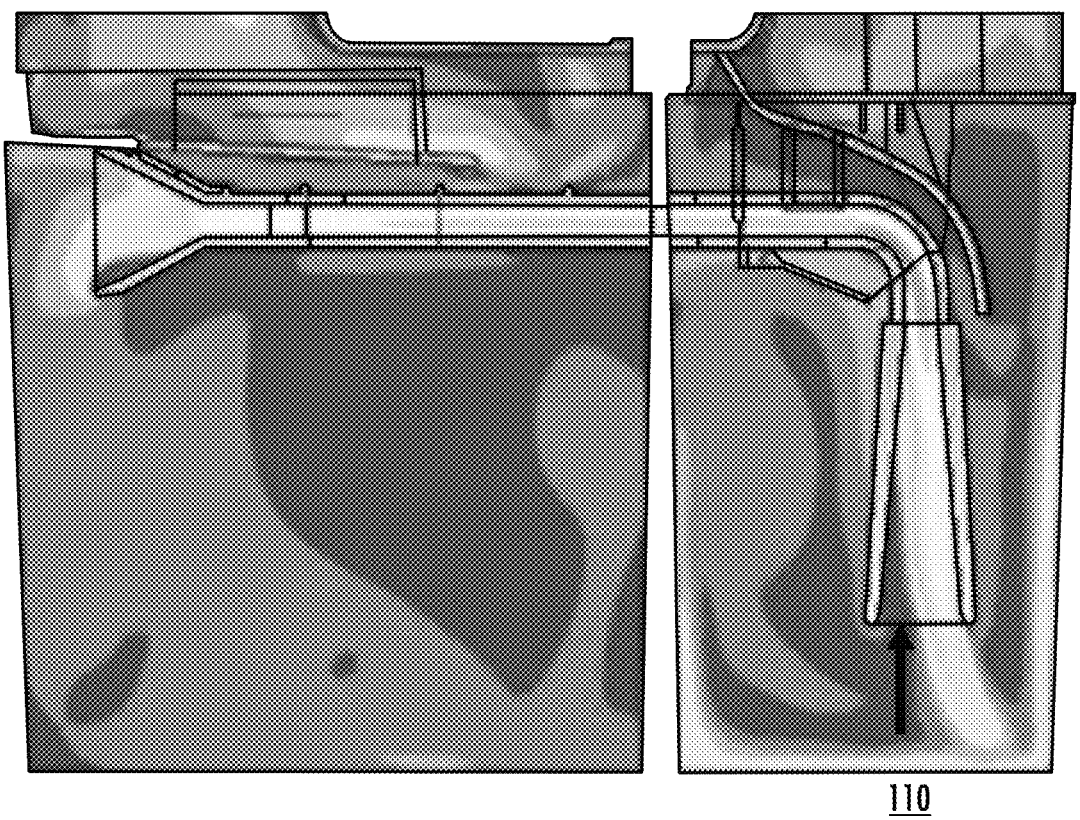
FIG. 1 is a diagram of a gas meter including a flowtube experiencing boundary layer flow separation.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed in the background, boundary layer flow separation may cause inconsistent flow velocities resulting from flow oscillation (variation), which affects measurement accuracy. Furthermore, flow separation may also cause increased pressure drop due to inefficient deceleration of the flow as it exits the flowtube. Accordingly, some embodiments address issues related to boundary flow separation by providing vortex generators in the flowtubes upstream of a diffuser. The presence of these vortex generators in the flowtubes may promote boundary layer adherence as will be discussed further herein with respect to FIGS. 2 through 5. When boundary layer adherence is promoted, many of the issues discussed above, such as increased pressure drops and inconsistent flow, may possibly be avoided.

Figures 2A, 2B:
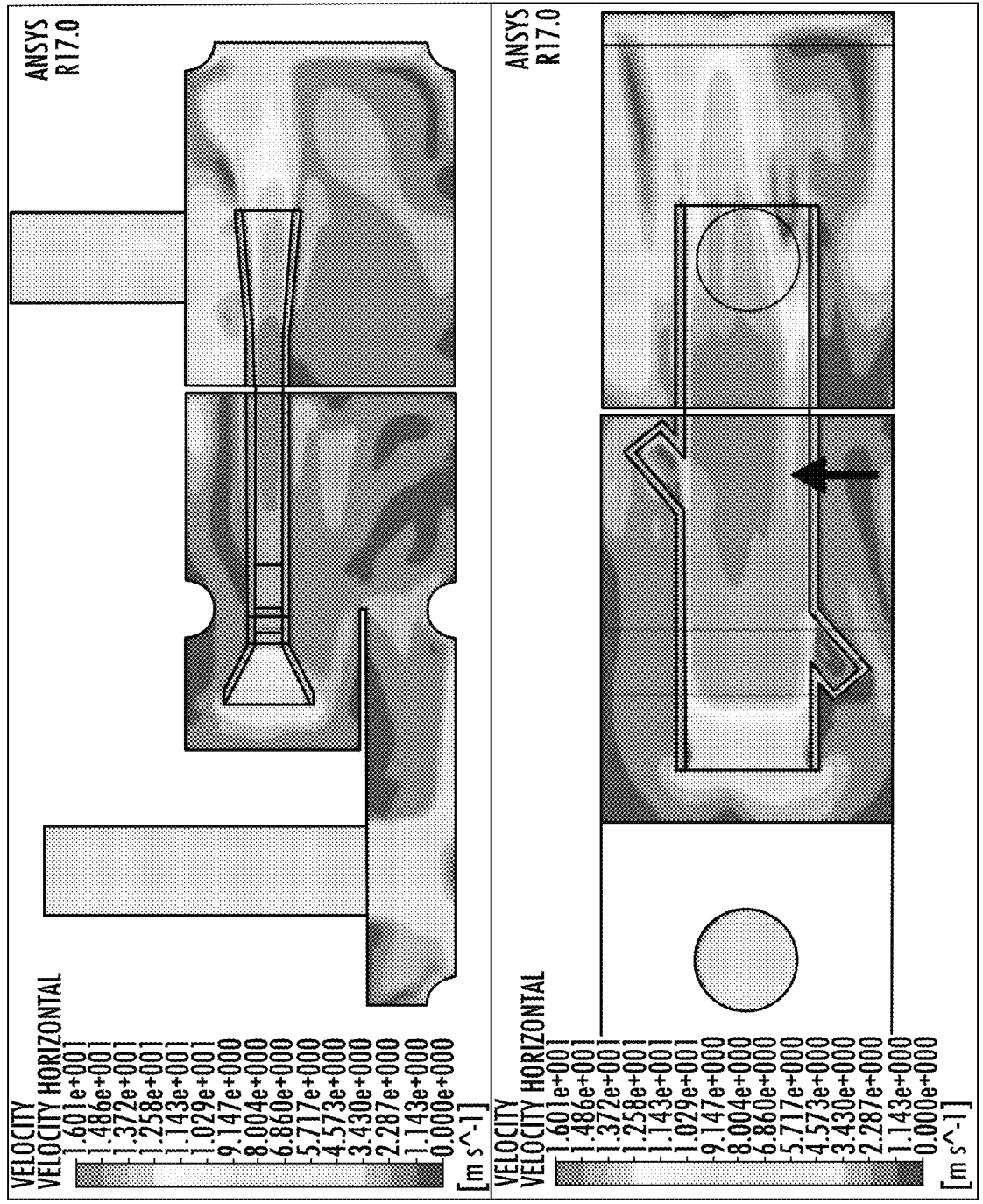
FIGS. 2A and 2B are flow simulations illustrating flow in a flowtube without a vortex generator.
Figure 3A:
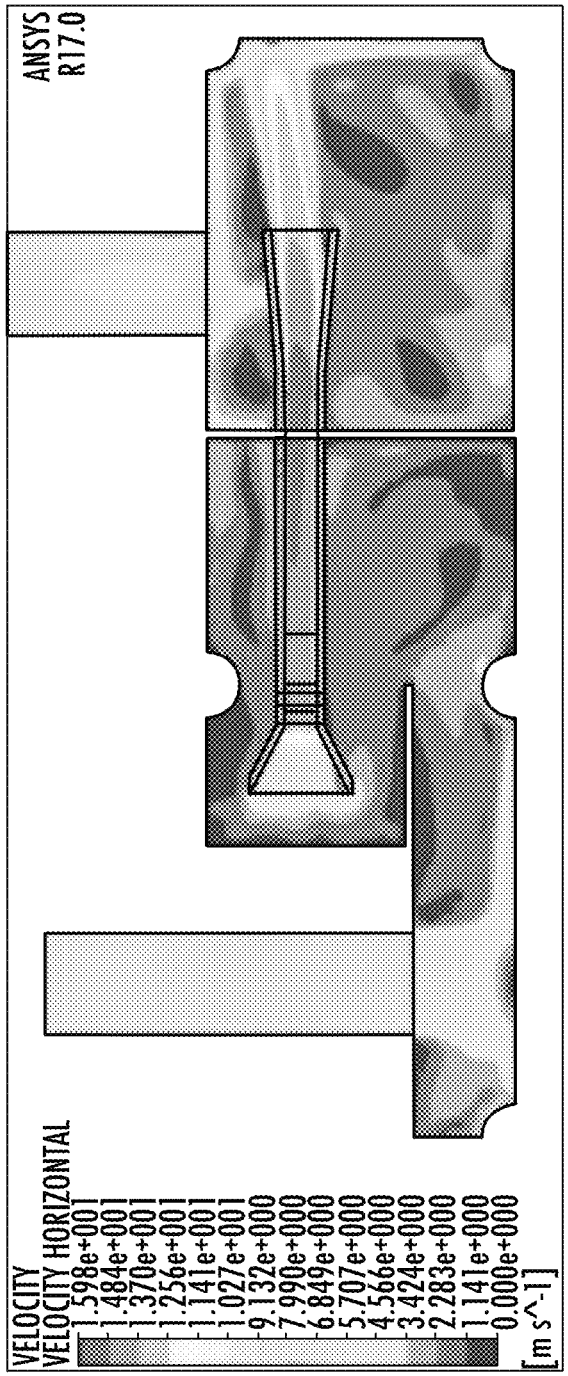
FIGS. 3A and 3B are flow simulations illustrating flow in a flowtube including a vortex generator in accordance with some embodiments of the present inventive concept.
Figure 3B:
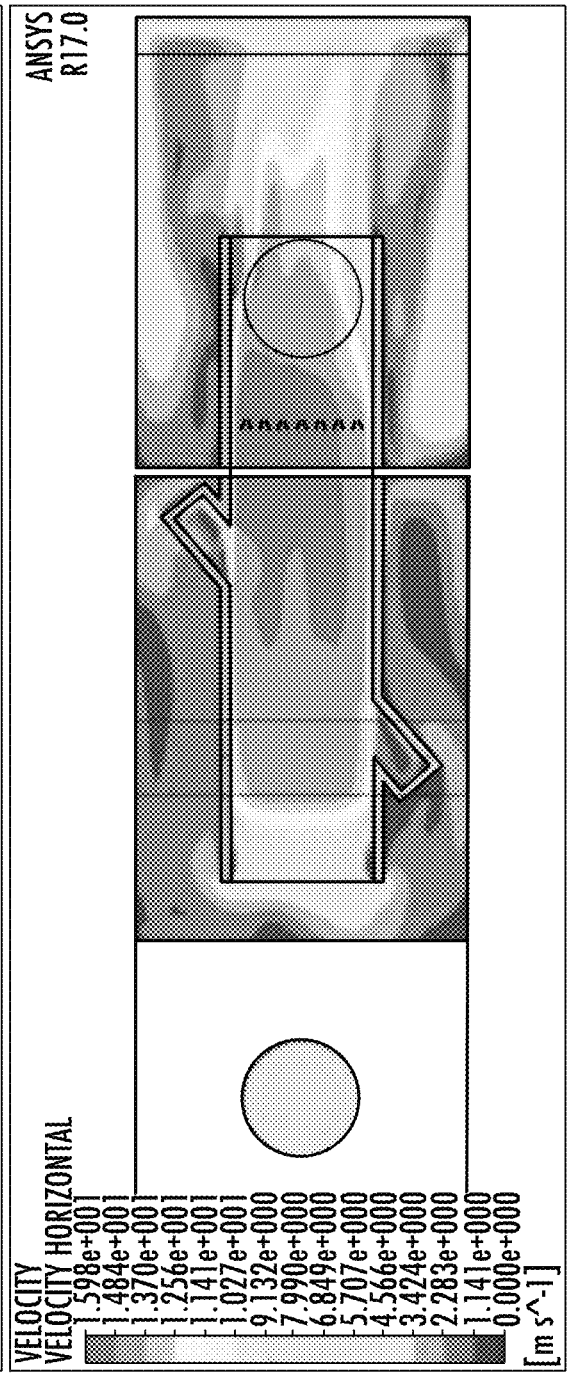

FIGS. 2A and 2B are flow simulations illustrating flow in a flowtube without a vortex generator. FIGS. 3A and 3B are flow simulations illustrating flow in a flowtube including a vortex generator in accordance with some embodiments of the present inventive concept. As illustrated in Figures, the overall flow profile without vortex generators (FIGS. 2A and 2B) is very similar to the flow profile of without vortex generators (FIGS. 3A and 3B), however, flow irregularities caused by boundary layer separation in the flowtubes of the non-vortex generator (FIGS. 2A and 2B) simulation propagate further upstream as indicated by an arrow on FIG. 2B than they do in the flowtubes of the vortex generator (FIGS. 3A and 3B). The simulations illustrated in FIGS. 2A through 3B were transient. In other words, as is understood, flow profiles vary with time, thus, making any direct comparison of pictures difficult.

Referring now to FIGS. 4A and 4B, a cross section of a meter 415 including a flowtube 435 having a vortex generator 425 in accordance with some embodiments of the present inventive concept will be discussed. It will be understood that although embodiments of the present inventive concept are discussed herein as being using in combination with a gas meter, embodiments of the present inventive concept are not limited this configuration. For example, vortex generators discussed herein may be used to effect the flow of other fluids, such as water, without departing from the scope of the present inventive concept.

Some embodiments of the present inventive concept may be used in meters designed for multiple classes, for example, both 200 and 400 cubic foot per hour natural gas meter capabilities may be accommodated by a single meter. However, embodiments of the present inventive concept may also be used in single class meters without departing from the scope of the present inventive concept.

Referring again to FIG. 4A, gas flowing through the flowtube 435 of the meter 415 may encounter a vortex generator 425 positioned slightly before the widening of the flowtube 435. Efficiently decelerating the flow of gas, at the outlet of a flowtube in a metering device is an important component in reducing the pressure drop across the flowtube 435. One method of decelerating flow in the flowtube is to gradually increase the cross-section of the flowtube, which reduces the velocity due to the increased area through which the gas flows. The increased area (resulting from the increased cross-section) is generally only effective if the boundary layer does not separate, i.e. the flow does not experience boundary layer flow separation as, discussed above. Thus, as discussed above, embodiments of the present inventive concept include a vortex generator 425 to improve boundary layer adherence. As illustrated in FIG. 4A, the vortex generator 425 is placed slightly upstream from the widening (increased cross-section) of the flowtube resulting in increased area and promotes turbulent flow. The turbulence in the flow decreases the likelihood of boundary separation.

Figure 5:
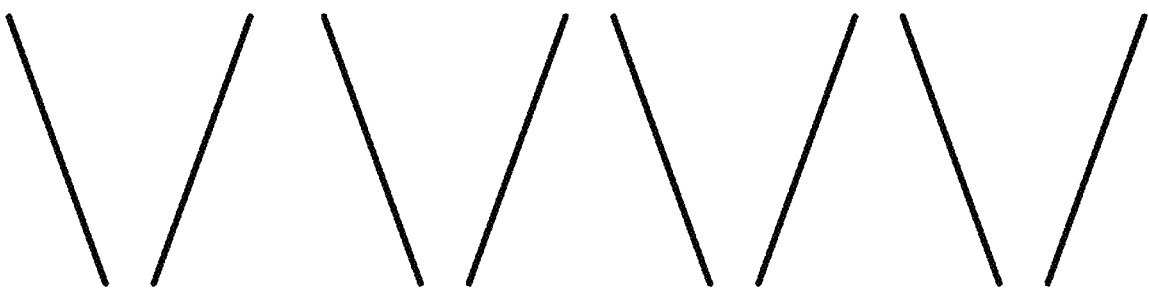
FIG. 5 is a diagram illustrating a shape of a vortex generator in accordance with some embodiments of the present inventive concept.

As illustrated in FIG. 4B, the vortex generator 425 is a raised portion in the flowtube 435 that disrupts the flow of gas, i.e. introduces turbulence into the flow. The vortex generator of FIG. 4B is a series of unconnected V-Shaped raised areas in the flowtube. A larger version of the shape of the vortex generator 425 illustrated in FIG. 4B is illustrated in FIG. 5. The raised areas may be molded into the plastic of the flowtube or positioned thereon after the fact without departing from the scope of the present inventive concept. Although the vortex generator in FIGS. 4A through 5 are shown as having a V-shape, vortex generators in accordance with embodiments of the present inventive concept may have any shape feasible for providing the necessary turbulence to reduce the likelihood of boundary flow separation as discussed herein. For example, the vortex generator may be provided by a plurality of raised elements on an inner surface of the flowtube, no matter the shape of the raised elements as long as the presence of the raised elements disrupts the flow. Additionally, if flow separates, the flow can start to oscillate and subsequently create a non-uniform velocity for a constant volumetric flowrate. This can cause accuracy issues. Keeping the boundary layer attached in accordance with embodiments discussed herein may avoid this issue altogether.

As briefly discussed above, how gas flows through a meter can affect the overall performance of the meter. One issue that routinely affects a meter's performance is flow separation. Thus, some embodiments of the present inventive concept provide a vortex generator in a flowtube in advance of a widening portion thereof. The presence of the vortex generator creates turbulence in the flow of gas and reduces the likelihood that boundary layer flow separation will occur in the flowtube.

In the drawings and specification, there have been disclosed typical preferred embodiments of the invention and, although specific teams are employed, they are used in a generic and descriptive sense only and not for purposes of limitation, the scope of the invention being set forth in the following claims.

That which is claimed is:

1. A vortex generator comprising a plurality of raised elements on an inner surface of a flowtube of a meter, the flowtube having a first portion having a uniform cross-section and a second portion, after the first portion having an increasing cross-section in a direction of flow and the plurality of raised elements being positioned on the inner surface of the first portion of the flowtube upstream of the increasing cross-section of the flowtube, wherein presence of the plurality of raised elements improves boundary layer adherence.

2. The vortex generator of claim 1, wherein the plurality of raised elements on the inner surface of the flowtube promote a turbulent flow in the flowtube.

3. The vortex generator of claim 1, wherein the plurality of raised elements comprise a plurality of shapes molded into a plastic inner surface of the flowtube.

4. The vortex generator of claim 3, wherein the plurality of shapes comprise a plurality of V shapes.

5. The vortex generator of claim 1, wherein the plurality of raised elements comprise a plurality of shapes positioned and affixed on a plastic inner surface of the flowtube.

6. The vortex generator of claim 1, wherein the meter comprises a gas meter.

7. A flowtube comprising:
   a first portion having a uniform cross-section and a second portion, after the first portion, having an increasing cross-section in a direction of flow in the flowtube at an end thereof, the second portion having the increasing cross-section providing an increased area of flow to decelerate the flow in the flowtube of a meter; and
   a vortex generator comprising a plurality of raised elements on an inner surface of the flowtube upstream of the second portion having an increasing cross-section, presence of the plurality of raised elements improving boundary layer adherence in the flowtube.

8. The flowtube of claim 7, wherein the plurality of raised elements on the inner surface of the flowtube promote a turbulent flow in the flowtube.

9. The flowtube of claim 7, wherein the plurality of raised elements comprise a plurality of shapes molded into a plastic inner surface of the flowtube.

10. The flowtube of claim 9, wherein the plurality of shapes comprise a plurality of V shapes.

11. The flowtube of claim 7, wherein the plurality of raised elements comprise a plurality of shapes positioned and affixed on a plastic inner surface of the flowtube.

12. The flowtube of claim 7, wherein the meter comprises a gas meter.

13. A meter comprising:
   a flowtube having a first portion having a uniform cross-section and a second portion, after the first portion, having an increasing cross-section in a direction of flow in the flowtube an end thereof, the second portion having the increasing cross-section providing an increased area of flow to decelerate the flow in the flowtube; and
   a vortex generator comprising a plurality of raised elements on an inner surface of the flowtube upstream of the second portion having an increasing cross-section, presence of the plurality of raised elements improving boundary layer adherence in the flowtube.

14. The meter of claim 13, wherein the plurality of raised elements on the inner surface of the flowtube promote a turbulent flow in the flowtube.

15. The meter of claim 13, wherein the plurality of raised elements comprise a plurality of shapes molded into a plastic inner surface of the flowtube.

16. The meter of claim 15, wherein the plurality of shapes comprise a plurality of V shapes.

17. The meter of claim 13, wherein the plurality of raised elements comprise a plurality of shapes positioned and affixed on a plastic inner surface of the flowtube.

18. The meter of claim 13, wherein the meter comprises a gas meter.

* * * * *